April 3, 1956 H. E. HAYNES 2,740,828
COLOR CORRECTION SYSTEMS
Filed Dec. 29, 1951
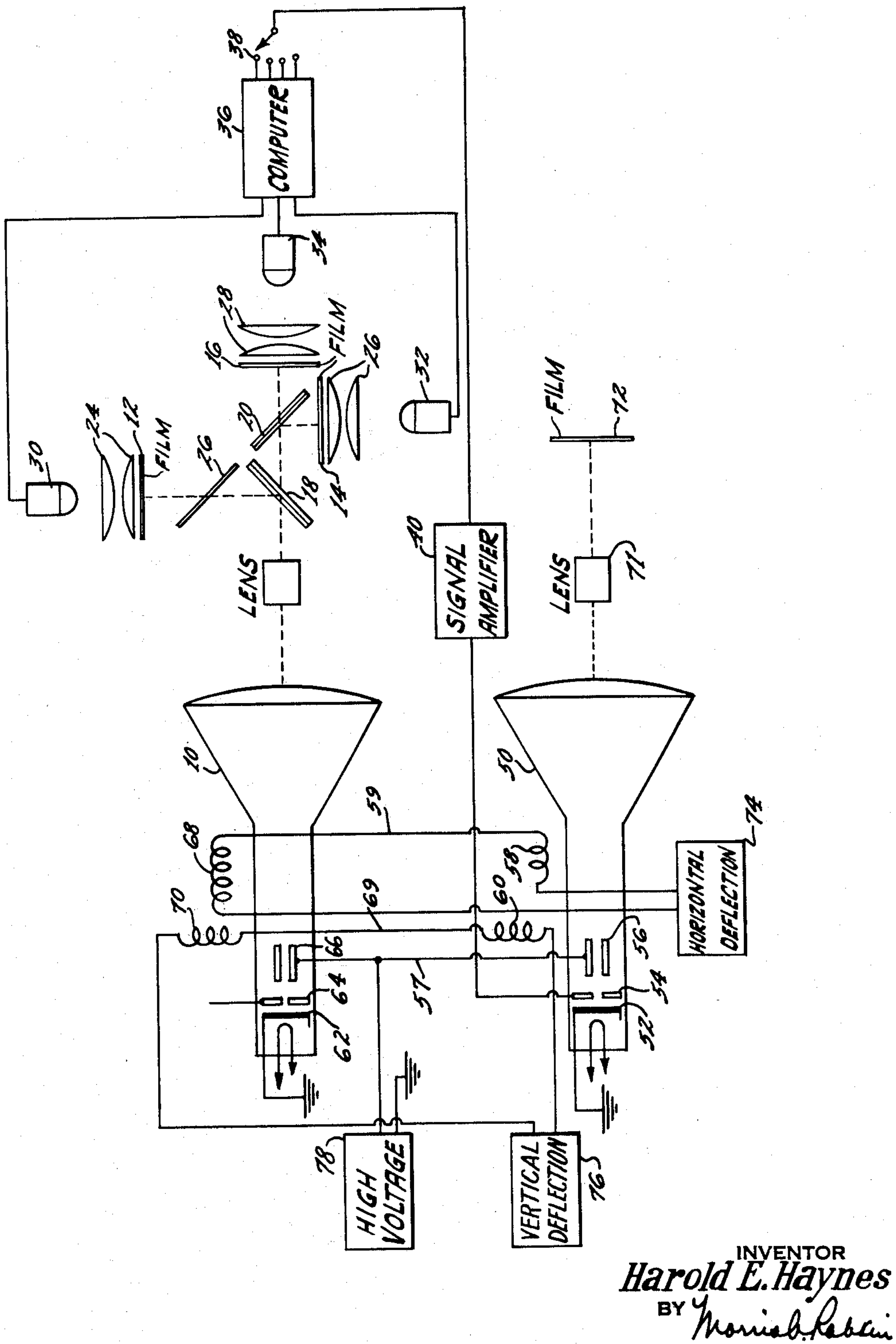
INVENTOR
Harold E. Haynes
BY Morris B. Rabkin
ATTORNEY United States Patent Office 2,740,828

Patented Apr. 3, 1956

2,740,828

COLOR CORRECTION SYSTEMS

Harold E. Haynes, Haddonfield, N. J., assignor to Radio Corporation of America, a corporation of Delaware Application December 29, 1951, Serial No. 264,117

7 Claims. (Cl. 178—5.2)

This invention relates to systems for making color corrected negatives from color separation negatives and more particularly to an improvement in the scanning and exposing systems employed therein.

In an article in the Journal of the Optical Society of America, volume 38, Number 4, April 1948, entitled "Color correction in color printing" by Arthur C. Hardy and F. L. Wurzburg, Jr., there is described a system for obtaining color corrected negatives from color separation positives. The color separation positives are made by photographing a subject through a red filter, a green filter, and a blue filter. The resultant negatives are called color separation negatives. These three negatives are then used to provide three photographic positives which use a monochrome representation of the tristimulus values of the original subject. The color separation negatives cannot be directly used for making printing plates for truly reproducing the original subject without some corrections being made. The color characteristics of the printing inks to be used as well as the color of the paper on which the print is to be made are some of the factors for which allowances must be made. The article above mentioned describes a system wherein the three color separation positives are scanned simultaneously to provide three electrical signals. These three signals are then applied to a computer which computes the required corrections and then provides, as an output, three corrected electrical signals. Each of these signals in turn is used to control the intensity of a light to which a negative is exposed. The mechanism in Figure 1 of the article shows that the three separation positives are scanned simultaneously while a fourth negative is exposed to the controlled light. A line by line scan is used and this complete scan is repeated three times while exposing three separate negatives and is done four times where a four color process is desired. Of course, each time a scan is made a different corrected output signal controls the exposure light. The resultant negatives are color corrected negatives and may be used for making printing plates.

The scanning and exposing system used with this color correction apparatus is a mechanical one. To eliminate the limitations and disadvantages of a mechanical system an electronic one has been proposed. A cathode ray tube providing an intense spot of light which is movable and is commonly known as a "flying spot scanner" is used as a scanning light source, and a second cathode ray tube, which has the intensity of its electron beam controlled by one of the output signals from the color correction computer, is used as the exposure light source. The scanner cathode ray tube provides a spot of light on its screen which, by means of a beam splitting arrangement, is split into three parts. Each of these three light beams is focussed on a corresponding spot on each of the three separation positives. The light transmitted through each negative is converted into an electrical signal by a photocell, and these electrical signals are applied to the color correction computer. The scanning cathode ray beam and the exposure cathode ray beam are deflected together so that, while the three color separation positives are being scanned, a color corrected negative is being exposed.

It was found that the electronic exposing and scanning system posed some very exacting requirements on the deflection systems of the cathode ray tubes. In one instance, the resolution required was at least 2000 lines overall, with at least 5 million elements in a picture. The geometrical distortion between the images being scanned and that being simultaneously reproduced as a color corrected negative must be negligible to the eye. For accurate reproduction, registration between four color corrected negatives should be less than one-half picture element in all parts of the image. In an 8 x 10 inch picture this may amount to less than 0.002 inch. Since, in the operation of the computer, each different color corrected negative is produced in sequence, at least one-half hour may elapse between exposing the first and exposing the last of the color corrected negatives. Accordingly, in the exposure of the three or four color corrected negatives, depending upon whether a three or four color process is desired, every element on the first color corrected negative should be reproduced in the same location on every one of the subsequent color corrected negatives being made within 0.002 inch.

Such a requirement of accurate registration of corrected negatives places an almost impossible burden on the regulation of the deflection power supplies used for the two cathode ray tubes.

It is accordingly an object of this invention to provide an electronic scanning and exposing system for a color correction system of the type described affording a high accuracy of registration.

It is a further object of the present invention to provide an electronic scanning and exposing system for a color correction system of the type described having a high accuracy of registerability and which is inexpensive.

It is still a further object of the present invention to provide a novel, simple and accurate deflection system for an electronic exposing and scanning system in a color correction system of the type described.

These and further objects of the invention are achieved by employing, in a color correction system, a first scanning cathode ray tube to scan the color separation positives and a second exposing cathode ray tube which has its beam modulated by the corrected electrical signals and is used as a light source to which sensitized plates are exposed to provide color corrected negatives. The vertical deflection coils of the two cathode ray tubes are connected in series, and the horizontal deflections coils are likewise connected in series. Vertical and horizontal deflection signals are respectively applied to the vertical and horizontal deflection coils. The second anodes of both cathode ray tubes are also connected in parallel and the required accelerating potential is applied to both tubes simultaneously.

The novel features of the invention as well as the invention itself, both as to its organization and method of operation, will best be understood from the following description when read in connection with the accompanying drawing, which is a schematic diagram of a color correction system having therein an embodiment of the invention.

Referring now to the drawing, there may be seen a schematic drawing of a color correction system employing an embodiment of the invention. A flying spot tube 10 which is a cathode ray tube providing a spot of light having a high lumen content is employed to scan three separation positives 12, 14 and 16. The flying spot tube 10 is of the type described in an article in Electronics, June 1948, page 124, entitled "The flying spot video generator" and may have a power supply such as is shown in the article. The three separation positives 12, 14, 16 are positioned to receive the light output from a beam splitter. This beam splitter is an arrangement of mirrors 18, 20, 22 which splits the light beam into three portions. The alinement of the positives is such that the three light beams strike a corresponding spot on each positive. The light output obtained is passed through condenser lenses 24, 26, 28 which concentrate this light upon three associated phototubes 30, 32, 34. The phototubes change the light variations into electrical signal variations. These three electrical signals are applied to a color correction computer 36 which may be of the type described in Patent No. 2,434,561 to A. C. Hardy et al.

The computer 36 computes the corrections required for the signals in order that a proper color separation negative may be produced. The computer provides four outputs 38 respectively corresponding to cyan, magenta, yellow and black color corrected electrical signals. One of these four signals is selected, amplified in a signal amplifier 40 and applied to the control grid 54 of a second exposing cathode ray tube 50 which may be a tube similar to the flying spot tube 10. The signal from the computer modulates the intensity of the cathode ray beam of the tube 50 and the light output from the cathode ray tube is affected accordingly. The light is focussed through a lens 71 upon a photosensitive film 72. The first cathode ray tube 10 scans the three separation positives 12, 14, 16 line by line. Simultaneously, the exposing tube 50 provides a light output which moves in synchronism line by line and thus the photosensitive film is exposed to a light signal which is modulated in accordance with the color corrected signal from the computer. The result is the production of a color corrected negative.

This negative may then be used for producing a plate for the subsequent halftone reproduction of the original image. One of the color corrected electrical signals at a time is selected and a single negative is exposed at a time. Accordingly, the first cathode ray tube 10 scans the separation positives 12, 14, 16 four times to provide four color corrected negatives.

In order that these four color corrected negatives be absolutely alike geometrically the position of the light spot on the exposing cathode ray tube 50 must be identical for a given position of the scanning tube light spot each time a negative is being exposed. Otherwise, when the resulting four printing plates obtained from the corrected negatives are superimposed upon one another to reproduce the original subject, there will be no exact superimposition; the resulting image would provide an out-of-register appearance which is completely unacceptable.

To meet the stringent requirements of registerability for the four corrected negatives, and the printing plates made from them, the horizontal deflection coil 68 of the first cathode ray tube 10 is connected in series with the horizontal deflection coil 58 of the second cathode ray tube by a lead 59. These series connected horizontal deflection coils 58, 68 are connected to a common source of horizontal deflection signals 74. Similarly, the vertical deflection coils 60, 70 of the first and second cathode ray tubes 10, 50 are connected in series by a lead 69 and connected to a common source of vertical deflection signals. The second anode accelerating electrodes 56, 66 are connected in parallel by a lead 57 and to a common source of high voltage 78 required as second anode accelerating potential. The focussing electrodes of both cathode ray tubes are also connected in parallel.

The remainder of the electrodes are connected to sources of supply in a conventional manner and accordingly need not be shown here. By the expedient of connecting the deflection coils in series, variations in the deflection currents occur to both tubes simultaneously. Assume that the separation positives are maintained in the same relation to the focussed light spot, and that, when a first scan occurs, a spot or element of the three separation positives is scanned and a corresponding spot of the corrected negative is exposed for certain deflection currents $x$ and $y$ respectively applied to the vertical and horizontal deflection coils. This spot will ordinarily be selected again only when the deflection currents $x$ and $y$ are applied to these coils. Accordingly, the spot on the color corrected negative corresponding to deflection currents $x$ and $y$ is reached only when deflection currents $x$ and $y$ occur. If, for some reason, the deflection currents change, then some other spot is illuminated and exposed. However, it is to be noted that the changes occur to both tubes simultaneously and not independently. The reason for connecting the second anode accelerating electrodes in parallel and applying the same potential to both is to make sure that the beam stiffness remains the same in both tubes, and any variation in the accelerating voltages affects the beam stiffness in both tubes simultaneously. If the deflection coils of both tubes are connected in parallel and then connected to a source of deflection voltages, there are sufficient variations in both tubes due to different thermal defects in the separate deflection coils to prevent obtention of registerable negatives to the required accuracy. When the deflection coils are in series as shown herein, any different thermal effects in one coil cause identical changes in deflection currents in both coils and accordingly the registerability of the color corrected negatives is unaffected. Independent reflection supplies generally cannot provide sufficiently close regulation so that registerable negatives to the required accuracy are obtained.

Although the above system is described with the beam splitting means, other systems may be employed for obtaining three light outputs from a single beam for scanning three separation positives. Furthermore, other types of color correction computers may be used, other than the one described. Accordingly, there has been described herein a system for obtaining accurate registerable color correction negatives for a period of time in a color correction system. The apparatus described is simple, inexpensive and unique.

What is claimed is:

1. In a system for obtaining color corrected negatives from color separation positives, a first scanning cathode ray tube having vertical and horizontal beam deflecting coils, means to simultaneously apply light output from said first tube to corresponding areas on each of said color separation positives, means to convert the light passing through each of said color separation positives into electrical signals, means to compute and apply color corrections to said electrical signals to obtain color corrected signals corresponding to each of the primary colors, a second exposing cathode ray tube having vertical and horizontal deflection coils, means to control said second cathode ray tube beam intensity with said color corrected signals corresponding to one of the primary colors, means to connect said first and second tube horizontal deflection coils in series, means to connect said first and second tube vertical deflection coils in series, means to apply deflection currents to said series connected horizontal deflection coils and to said series connected vertical deflection coils, a single source of accelerating potentials, and means to apply accelerating voltages to said first and second cathode ray tube from said single potential source.

2. In a system for obtaining color correction negatives from color separation positives wherein the light output from a first scanning cathode ray tube having vertical and horizontal beam deflecting coils is simultaneously applied to corresponding areas on each of said color separation positives, and wherein the light passing through each of said color separation positives is converted into electrical signals and computing apparatus applies corrections to said signals to provide color corrected signals, one of which is applied to control the intensity of the beam of a second exposing cathode ray tube having vertical and horizontal deflection coils, the combination with said system of means for synchronizing the deflection of the cathode ray beams of said first and second cathode ray tubes, including means to couple the vertical deflection coils of said first and second cathode ray tubes in series, means to couple the horizontal deflection coils of said first and second cathode ray tubes in series, means for applying deflecting currents to said vertical and to said horizontal deflection coils, a single source of accelerating potentials, and means to apply accelerating potentials from said single source to both said cathode ray tubes.

3. In a system for obtaining color correction negatives from color separation positives, wherein the light output from a first scanning cathode ray tube having a horizontal beam deflecting coil, a vertical beam deflecting coil and an accelerating electrode is used to scan said color separation positives and color corrected electrical signals are generated from the light passing through said separation positives, one of said signals being used to control the beam intensity of a second cathode ray tube having a vertical deflecting coil, a horizontal deflection coil and an accelerating electrode, the light output from said second cathode ray tube being used to expose a negative, the combination with said system of an improved synchronizing system comprising means connecting said first and second vertical deflection coils in series, means connecting said first and second horizontal deflection coils in series, means to apply vertical deflecting signals to said series connected vertical deflection coils, means to apply horizontal deflecting signals to said series connected horizontal deflection coils, means coupling said first and second tube accelerating electrodes in parallel, and means to apply operating potentials to said parallel connected accelerating electrodes.

4. In a system for obtaining color corrected negatives from color separation positives of the type employing a scanning light source for said color separation negatives including a first cathode ray tube having a focussing electrode, an acceleration electrode and vertical and horizontal beam deflecting coils, and an exposing light source for said color corrected negatives including a second cathode ray tube having a focussing electrode, an acceleration electrode and vertical and horizontal beam deflecting coils, the combination with said system of means to accurately synchronize deflection of the cathode ray beam of both said tubes comprising means to connect the vertical beam deflecting coil of said first tube in series with the vertical beam deflecting coil of said second tube, means to connect the horizontal beam deflecting coil of said first tube in series with the horizontal beam deflecting coil of said second tube, means to apply horizontal and vertical deflection currents to said respective series-connected, horizontal deflection coils and vertical deflection coils, means to connect the focussing electrodes of both said tubes in parallel, means to connect the accelerating electrodes of both said tubes in parallel, and means to apply operating potentials to said parallel connected accelerating electrodes.

5. In a system for obtaining color correction records from a subject having color characteristics, the combination of a first scanning cathode ray tube having vertical and horizontal beam deflecting coils for applying scanning light to said subject to be modified by said subject in accordance with said color characteristics, means to convert said modified light to electrical signals, means to correct said electrical signals in accordance with predetermined color relationships to obtain color corrected signals, a second exposing cathode ray tube having vertical and horizontal deflection coils, means to control the light output of said second tube with said color corrected signals, means to connect said first and second tube horizontal deflection coils in series, means to connect said first and second tube vertical deflection coils in series, and means to apply deflection currents to said series connected horizontal deflection coils and to said series connected vertical deflection coils.

6. In a system for obtaining a plurality of color corrected records corresponding to different primary colors from a subject having color characteristics, said system employing a scanning light source for said subject including a first cathode ray tube having vertical and horizontal deflection coils, and an exposing light source for said color corrected negatives including a second cathode ray tube having vertical and horizontal deflection coils, the combination with said system and said light sources of means to synchronize accurately deflection of the cathode ray beams of said tubes to provide for accurate registration of said color corrected records, said synchronizing means comprising means to connect in the same series circuit the vertical deflection coils of said first and second tubes, means to connect in the same series circuit the horizontal deflection coils of said first and second tubes, and means to apply deflection currents to said series connected horizontal deflection coils and to said series connected vertical deflection coils.

7. In a system for obtaining photographic records from a subject having color characteristics, the combination of a first scanning cathode ray tube having vertical and horizontal beam deflecting coils, means for directing a scanning light spot produced by said first tube to said subject to be modified by said subject in accordance with said color characteristics, means for receiving said modified light and for producing electrical signals in accordance therewith, a second cathode ray tube for successively exposing a plurality of photographic records, said second tube having vertical and horizontal deflection coils, means to apply said electrical signals to said second tube to control the amount of exposure light, and means to synchronize the deflection of the cathode ray beams of said tubes to provide accurate registration of said plurality of records, said synchronizing means comprising means to connect in series said first and second tube horizontal deflection coils, means to connect in series said first and second tube vertical deflection coils, and separate means for respectively applying deflection currents to said series connected horizontal and vertical deflection coils.

References Cited in the file of this patent

UNITED STATES PATENTS

| | | |
|---|---|---|
| 2,434,561 | Hardy | Jan. 13, 1948 |
| 2,567,040 | Sziklai | Sept. 4, 1951 |